United States Patent
Burkman (10) Patent No.: US 9,660,379 B1
(45) Date of Patent: May 23, 2017

(54) VEHICLE ELECTRICAL CONNECTOR ASSEMBLY AND CONNECTION METHOD

(71) Applicant: FORD GLOBAL TECHNOLOGIES, LLC, Dearborn, MI (US)

(72) Inventor: Wesley Edward Burkman, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/157,759

(22) Filed: May 18, 2016

(51) Int. Cl.
*H01R 13/506* (2006.01)
*H01R 24/28* (2011.01)
*H01R 24/20* (2011.01)
*H01R 13/627* (2006.01)
*H01R 13/629* (2006.01)

(52) U.S. Cl.
CPC ....... *H01R 13/6273* (2013.01); *H01R 13/629* (2013.01)

(58) Field of Classification Search
CPC .... H01R 27/00; H01R 31/00; H01R 2103/00; H01R 13/506; H01R 24/28; H01R 24/20
USPC ....... 439/171, 173, 174, 582, 446, 686, 694, 439/687
See application file for complete search history.

(56) References Cited

U.S. PATENT DOCUMENTS

| | | | |
|---|---|---|---|
| 1,984,181 A * | 12/1934 | French | H01R 13/56 439/694 |
| 3,747,049 A * | 7/1973 | Cressman | H01R 13/56 439/466 |
| 5,277,590 A | 1/1994 | Thomas et al. | |
| 5,649,834 A | 7/1997 | Allison et al. | |
| 5,882,226 A * | 3/1999 | Bell | H01R 9/032 439/11 |
| 6,645,006 B1 | 11/2003 | Crisanti et al. | |
| 6,739,906 B2 * | 5/2004 | Lawrence | H01R 13/5216 174/93 |
| 7,168,969 B1 * | 1/2007 | Wang | H01R 13/213 439/173 |
| 7,207,844 B2 * | 4/2007 | Peng | H01R 13/64 439/173 |
| 7,753,076 B2 * | 7/2010 | Mita | H01R 4/183 137/625.64 |
| 8,579,656 B2 * | 11/2013 | Huang | H01R 35/04 439/171 |

(Continued)

FOREIGN PATENT DOCUMENTS

DE      4034425      7/1995

*Primary Examiner* — Gary Paumen
(74) *Attorney, Agent, or Firm* — Carlson, Gaskey & Olds, P.C.

(57) ABSTRACT

An exemplary vehicle connector assembly includes, among other things, a first housing, and a second housing configured to selectively engage the first housing in a first position to accommodate a first take-out location. The first housing is further configured to engage the second housing in a second position to accommodate a second take-out location different than the first take-out location. An exemplary electrical connection method includes, among other things, securing a first housing of a connector to a second housing in a first position to accommodate a first take-out location. The first housing is securable to the second housing in a second position to accommodate a second take-out location instead of the first take-out location. The first position circumferentially offset from the second position.

20 Claims, 5 Drawing Sheets

(56) References Cited

U.S. PATENT DOCUMENTS

| | | | |
|---|---|---|---|
| 8,686,683 B2 * | 4/2014 | Caskey | H01R 13/6675 320/107 |
| 8,968,023 B1 * | 3/2015 | Walters | H02G 3/0633 439/446 |
| 9,011,171 B2 * | 4/2015 | Feye-Hohmann | H01R 13/6273 439/350 |
| 9,046,256 B2 | 6/2015 | Szprengiel et al. | |

* cited by examiner

VEHICLE ELECTRICAL CONNECTOR ASSEMBLY AND CONNECTION METHOD

TECHNICAL FIELD

This disclosure relates generally to an electrical connector for a vehicle and, more particularly, to a connector that can accommodate a take-out in a plurality of different locations.

BACKGROUND

Electrified vehicles differ from conventional motor vehicles because electrified vehicles are selectively driven using one or more electric machines powered by a battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Conventional and electrified vehicles can use various connectors. For example, in electrified vehicles, a connector can electrically couple a first end of a high-power lead line to a battery pack bus bar. Another connector electrically couples an opposing, second end of the high-power lead line to a junction box. Still other connectors can connect low-power lead lines, such as signal lines, to the battery pack and a junction box.

In some examples, a lead line exits the connector along a first axis, and the connector engages a connection interface along a second axis transverse to the first direction. When the first axis is 90-degrees offset from the second direction, the connector is commonly referred to as a 90-degree connector.

SUMMARY

A vehicle connector assembly, according to an exemplary aspect of the present disclosure includes, among other things, a first housing and a second housing. The second housing is configured to selectively engage the first housing in a first position to accommodate a first take-out location, and in a second position to accommodate a second take-out location different than the first take-out location.

In another example of the foregoing assembly, the first position is circumferentially offset from the second position.

Another example of the foregoing assembly includes clips and fingers. The clips are configured to engage corresponding ones of the fingers to hold a circumferential position of the first housing relative to the second housing.

In another example of any of the foregoing assemblies, the clips contact the corresponding ones of the fingers to limit circumferential movement of the first housing relative to the second housing.

Another example of any of the foregoing assemblies includes clips and a radially extending ring. The clips configured to engage the radially extending ring to hold the first housing relative to the second housing.

In another example of any of the foregoing assemblies, a lead is attached to a tab held within the first housing and the second housing. The first and second take-out locations are where the lead extends from the tab.

In another example of any of the foregoing assemblies, the lead is ultrasonically welded to the tab.

In another example of any of the foregoing assemblies, the lead is a high-voltage lead and has a diameter that is five millimeters or more.

In another example of any of the foregoing assemblies, the lead is circumferentially surrounded by a shield portion of the first housing, the second housing, or both.

In another example of any of the foregoing assemblies, the lead extends from the tab in a first direction, and a terminal connector extends from the tab in a second direction transverse to the first direction.

In another example of any of the foregoing assemblies, the first housing and the second housing comprise portions of a 90-degree connector.

Another example of any of the foregoing assemblies includes a lead and a traction battery of an electrified vehicle. The connector electrically couples the lead to the traction battery.

Another example of any of the foregoing assemblies includes a lead and a high-voltage junction box of an electrified vehicle. The connector electrically couples the lead to the high-voltage junction box.

An electrical connection method according to another exemplary aspect of the present disclosure includes, among other things, securing a first housing of a connector to a second housing in a first position to accommodate a first take-out location. The first housing is securable to the second housing in a second position to accommodate a second take-out location instead of the first take-out location. The first position is circumferentially offset from the second position.

Another example of the foregoing method includes contacting clips in the first housing against fingers in the second housing to limit circumferential movement of the first housing relative to the second housing.

Another example of any of the foregoing methods includes engaging a radially extending ring of the second housing with a clips extending from the first housing to secure the first housing relative to the second housing.

In another example of any of the foregoing methods the first take-out location is where a lead extends from a tab held within the first housing and second housing. The lead extends from the tab in a first direction, and a terminal connector extends from the tab in a second direction transverse to the first direction.

In another example of any of the foregoing methods the connector is a 90-degree connector.

Another example of any of the foregoing methods, includes electrically coupling a lead to a traction battery of an electrified vehicle through the connector.

Another example of any of the foregoing methods, includes electrically coupling a lead to a high-voltage junction box of an electrified vehicle through the connector.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure is generally directed toward a connector for a vehicle. More particularly, the disclosure is directed toward an electrical connector housing that can accommodate a plurality of different take-out locations for a lead. This permits a common connector housing to be used in locations requiring different take-out locations, which reduces part complexity.

Figure 1:
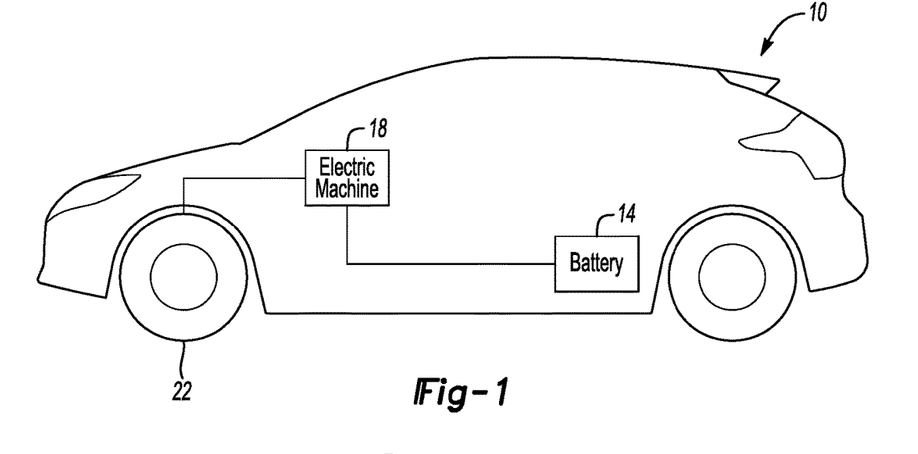
FIG. 1 shows a side view of an example electric vehicle incorporating a battery pack.

Referring to FIG. 1, an example electrified vehicle 10 includes a battery pack 14, an electric machine 18, and a pair of vehicle drive wheels 22. The electric machine 18 can receive electric power from the battery pack 14. Under some operating conditions, the electric machine 18 converts the electric power to torque that drives the wheels 22. Under other operating conditions, the electric machine 18 can convert mechanical kinetic energy of the vehicle 10 back into electric power to charge the battery pack 14. The illustrated battery pack 14 comprises a relatively high-voltage traction battery in some embodiments.

The exemplary vehicle 10 is an all-electric vehicle. In other examples, the electrified vehicle 10 is a hybrid electric vehicle, which can selectively drive the wheels 22 with torque provided by an internal combustion engine instead of, or in addition to, the electric machine 18. In still other examples, the vehicle 10 is a fuel cell vehicle or some other type of vehicle.

Figure 2:
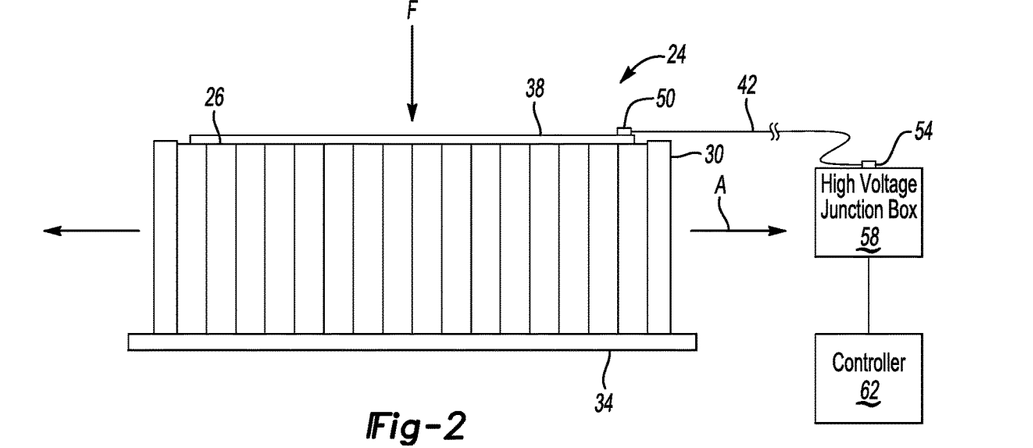
FIG. 2 shows a side view of an array from the battery pack of FIG. 1 electrically coupled to a high-voltage junction box using a lead and connectors.

Referring now to FIG. 2 with continuing reference to FIG. 1, an array 24 of the battery pack 14 includes a plurality of individual battery cell assemblies 26 disposed along an axis A and sandwiched axially between endplates 30. The battery pack 14 can include the array 24 and several other arrays. The array 24 is considered a module or stack in some examples.

The battery cell assemblies 26 and endplates 30 are disposed adjacent to a thermal exchange plate 34. The thermal exchange plate 34 is used to control heat levels within the battery cell assemblies 26. In other examples, the battery pack 14 does not include any thermal exchange plate.

A bus bar assembly 38 is positioned atop the battery cell assemblies 26. The bus bar assembly 38 is electrically connected to terminals of the battery cells assemblies 26. Power can move to and from the battery cell assemblies 26 through the bus bar assembly 38.

In this example, a first connector assembly 50 electrically connects a first end of a lead 42 to the bus bar assembly 38, and a second connector 54 electrically connects an opposing, second end of the lead 42 to a high-voltage junction box 58. Power moves to and from the bus bar assembly 38 through the lead 42 and connectors 50, 54. Since the lead 42 communicates relatively high-voltage power, the lead 42 is considered a high-voltage lead.

An electrical controller 62 can be operatively connected to the high-voltage junction box 58 to control power flow. The high-voltage junction box 58 and electrical controller 62 control a distribution of power between the array 24 and other portions of the vehicle 10. A person have skill in this art and the benefit of this disclosure could understand how to use the high-voltage junction box 58 and electrical controller 62 to distribute power to and from the array 24 and other arrays within the battery pack 14.

The lead 42 is a first lead that electrically couples an input of a positive bus bar in the bus bar assembly 38 to the high-voltage junction box 58. The vehicle 10 can additionally include a second lead, third lead, and fourth lead. For drawing clarity the other leads are omitted from FIG. 2.

The second lead can electrically couple an output of the positive bus bar to the high-voltage junction box 58. The third lead can electrically couple an input of a negative bus bar of the bus bar assembly 38 to the high-voltage junction box 58. The fourth lead can electrically couple an output of the negative bus bar to the high-voltage junction box 58. The second lead, third lead, and fourth lead are configured generally the same as the lead 42. The connectors associated with the second lead, third lead, and fourth lead are configured generally the same as the connectors 50, 54.

In addition to the high-voltage leads, the vehicle 10 can include low-voltage leads connected to the bus bar assembly 38, or another portion of the array 24 using connectors. The low-voltage leads can be used to communicate low-voltage signals used for control purposes, or to transfer power. The connectors associated with the low-voltage leads are configured generally the same as the connectors 50, 54. The connectors of the disclosed examples can be used in connection with high-voltage leads or low-voltage leads. The low-voltage leads typically have a diameter from 0.5 to 1 millimeter. High-voltage power leads, such as the lead 42, have a diameter that is typically 5 millimeters or greater.

Referring now to FIGS. 3 to 8 with continuing reference to FIG. 2, the first connector assembly 50 electrically couples the lead 42 to the bus bar assembly 38. The example connector assembly 50 includes a male portion 66 that is received within a female portion of the bus bar assembly 38. When the male portion 66 is received within the female portion of the bus bar assembly 38, a terminal connector 70 of the connector 50 electrically connects to corresponding pins of the bus bar assembly 38. A person having skill in this art and the benefit of this disclosure would understand how to electrically connect the terminal connector 70 to a corresponding terminal or pin within the bus bar assembly 38.

A first housing 74 of the connector assembly 50 provides the male portion 66. The terminal connector 70 is held within the first housing 74. The terminal connector 70 terminates at a tab 78. The terminal connector 70 is aligned transversely to the tab 78.

Figure 3:
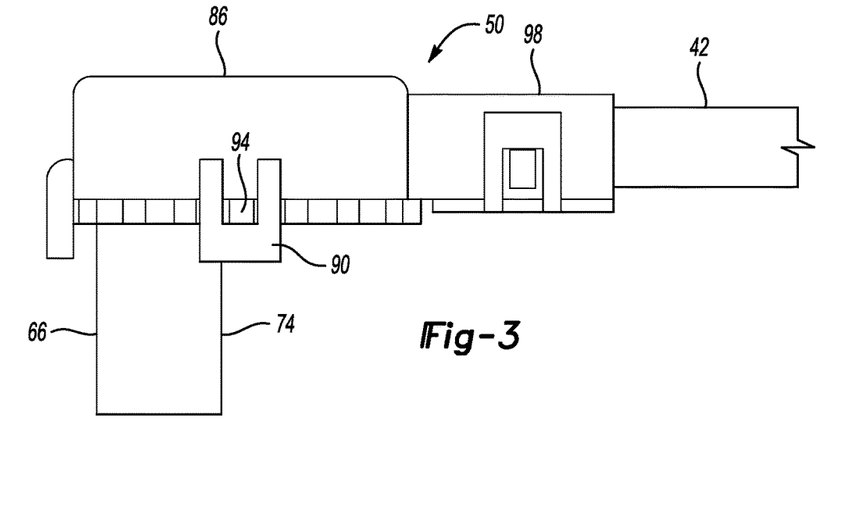
FIG. 3 shows a side view of an example connector used in the battery pack of FIG. 2.
Figure 4:
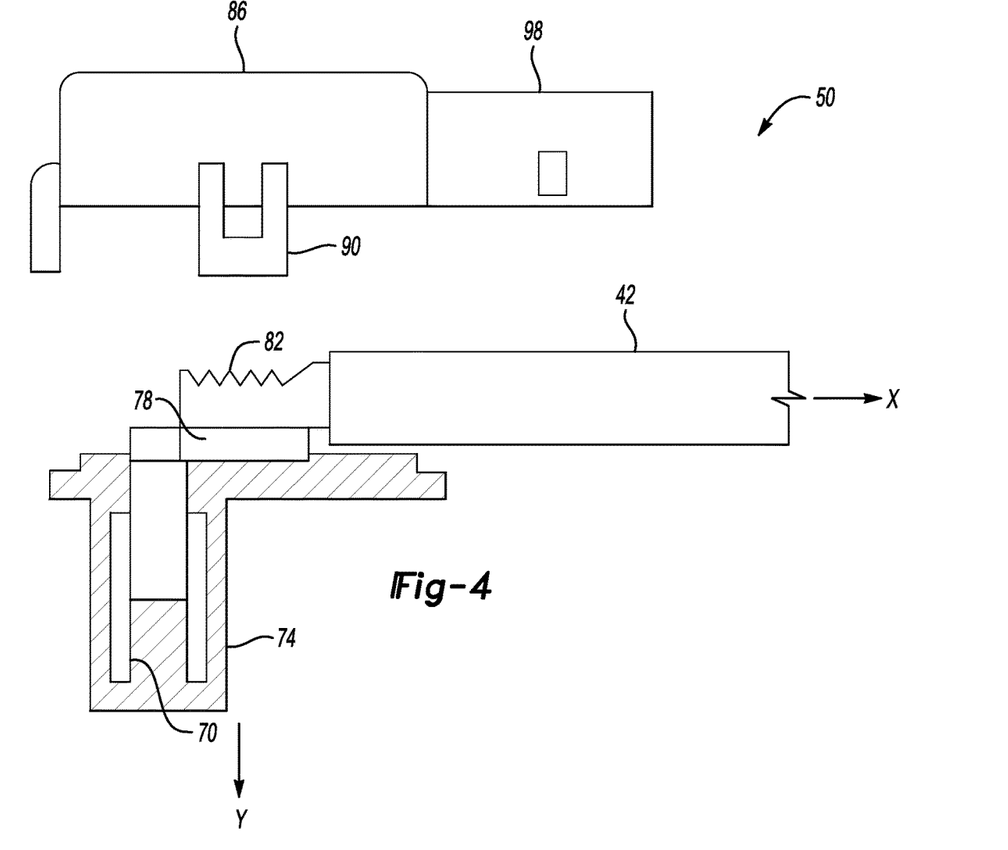
FIG. 4 shows an exploded and partially sectioned view of the connector of FIG. 3.

In this example, a wire 82 of the lead 42 is directly secured to the tab 78 to electrically couple the lead 42 to the terminal connector 70. The terminal connector 70 is a metallic material in this example, and the wire 82 is copper. The example wire 82 is ultrasonically welded to the tab 78 so the tab 78 is considered a weld tab. In another example, the wire 82 could be crimped, resistance welded, or laser welded to the tab 78.

Where the lead 42 extends from the connector assembly 50 is referred to as the take-out location for the connector. In this example, the lead 42 extends from the tab 78 and the connector assembly 50 along an axis X, and the terminal connector 70 extends from the tab 78 along an axis Y. Notably, the axis Y is 90 degrees offset from the axis X. The connector assembly 50 is considered a 90 degree connector since the take-out location of the lead 42 from the connector assembly 50 is 90 degrees offset from the terminal connector 70.

In some examples, specific take-out locations within the vehicle 10 and the battery pack 14 are desired. For example, a take-out location that directs the lead 42 toward the high-voltage junction box 58 could be desired to reduce bends in the lead 42. Further, packaging constraints can also require particular take-out locations.

The connector assembly 50 can have a desired take-out location that is different than a desired take-out location for other connectors, such as the connector assembly 50, the connectors associated with the other high-voltage lines, and the connectors associated with the low-voltage lines. The example connector assembly 50 can be configured to accommodate several different take-out locations for the lead 42. Thus, a single connector design can be used in several different areas of the vehicle 10.

The example connector assembly 50 includes a second housing 86 that is secured to the first housing 74 after the lead 42 is secured to the tab 78. To hold together the second housing 86 and the first housing 74, clips 90 bend and are received beneath fingers 94.

Figure 5:
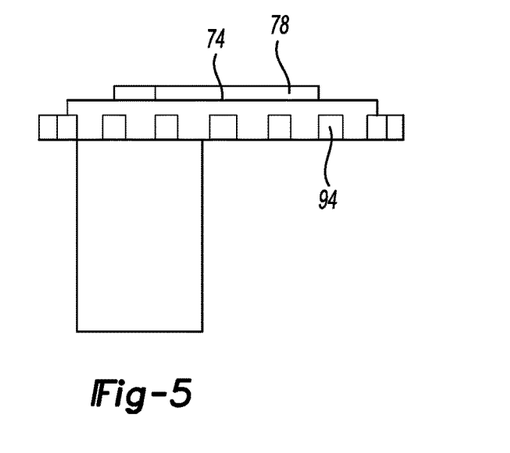
FIG. 5 shows a side view of a first housing of the connector of FIG. 3.
Figure 6:
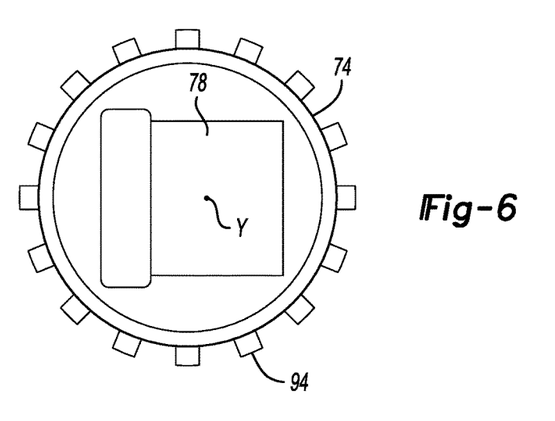
FIG. 6 shows a top view of the first housing of FIG. 5.

The first housing 74 includes a plurality of the fingers 94 distributed annularly about the axis Y. The second housing 86 can engage the first housing 74 at a plurality of different circumferential positions by connecting rotating the second housing 86 about the axis Y relative to the first housing 74 and then connecting the clips 90 to different fingers 94. The example first housing 74 includes sixteen fingers 94, and thus sixteen possible circumferential positions for the second housing 86 to engage the first housing 74.

Figure 7:
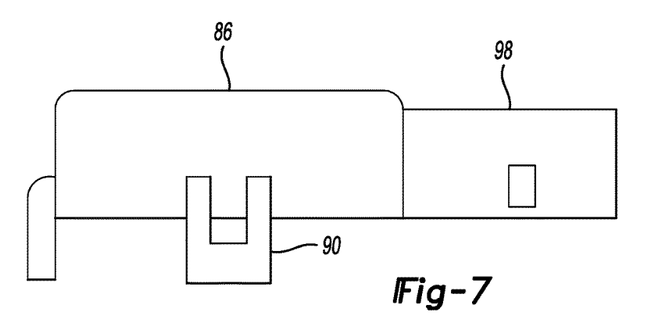
FIG. 7 shows a side view of a second housing of the connector of FIG. 3.
Figure 8:
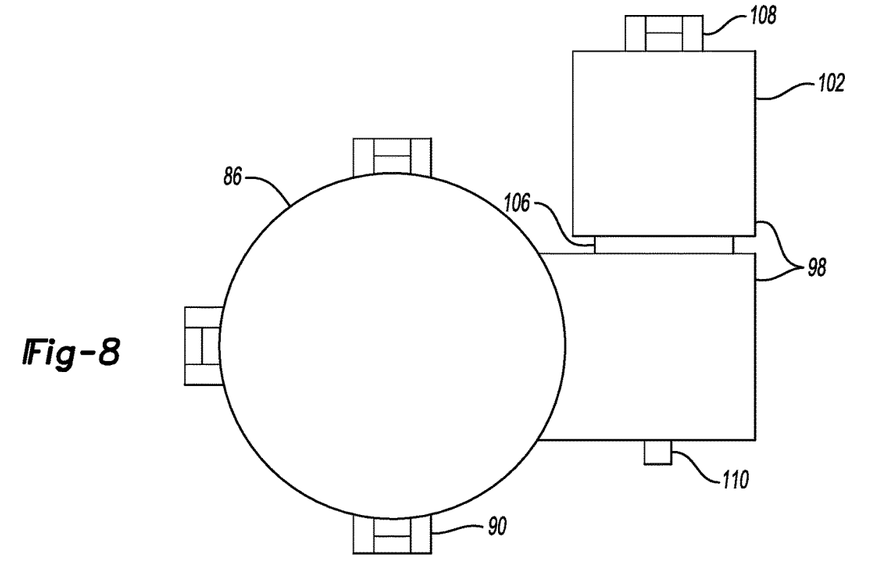
FIG. 8 shows a top view of the second housing of FIG. 7.

A shield portion 98 of the second housing 86 is configured to receive the lead 42 when the first housing 74 and the second housing 86 are secured to each other. The second housing 86 engages the first housing 74 in a position that circumferentially aligns the shield portion 98 with the lead 42 and the take-out direction of the lead 42.

A flange 102 of the shield portion 98 is rotatable about a living hinge 106 so that a clip 108 can engage a finger 110. When the clip 108 engages the finger 110 and the first housing 74 is secured to the second housing 86, the shield portion 98 circumferentially surrounds the lead 42 about the axis X.

If the lead 42 is moved sufficiently in directions transverse to the axis X, the lead 42 will contact the shield portion 98 to prevent some bending and kinking of the lead 42. If forces are applied to the second housing 86 that cause the second housing 86 to move relative to the first housing 74 about the axis Y, the forces associated with such movement can be absorbed at the interfaces between the clips 90 and the fingers 94. Thus, movement of the lead 42 does not overly stress and disrupt the attachment between the wire 82 and the tab 78. The shield portion 98 can also provide a barrier for finger proofing, which is particularly applicable to high-voltage applications.

Although the example connectors 50 include fingers 94 on the first housing 74 and clips 90 on the second housing 86 other arrangements are possible. Such as, for example, one or more of the clips 90 could extend from the first housing 74, and one or more of the fingers 94 could extend from the second housing 86. Still other examples could use an attachment strategy other than the clips 90 and fingers 94, such as securing the first housing 74 to the second housing 86 using an adhesive or ultrasonic welding.

Referring to the shield portion 98, the clip 108 and the finger 110 could be switched in other examples.

Figure 9:
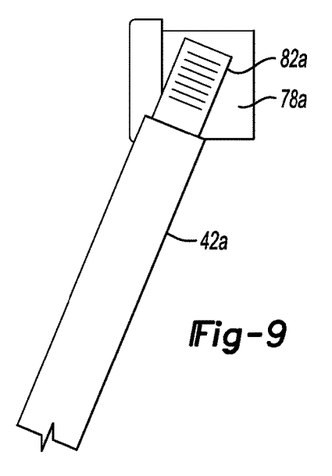
FIG. 9 shows a step in an assembly process for another example connector suitable for use in the battery pack of FIG. 1.

Referring now to FIGS. 9-12, an example assembly process for a connector assembly 50*a* process includes attaching a wire 82*a* to a tab 78*a* as shown in FIG. 9. Assembly fixtures can be used to hold a position of the tab 78*a* relative to a lead 42*a* during the attaching. The circumferential orientation of the take-out is fixed once a wire 82*a* of the lead 42*a* is secured to the tab 78*a*.

In this example, if the 12 o'clock position is at the top of the page, the lead 42*a* extends from the tab 78*a* at approximately a 7 o'clock position. If, for example, the lead 42*a* were desired to extend from the tab 78*a* at a 3 o'clock position, like the connector assembly 50 of FIG. 3, the assembly fixtures could be changed or adjusted so that the lead 42*a* is secured to the tab 78*a* in the 3 o'clock position.

Figure 10:
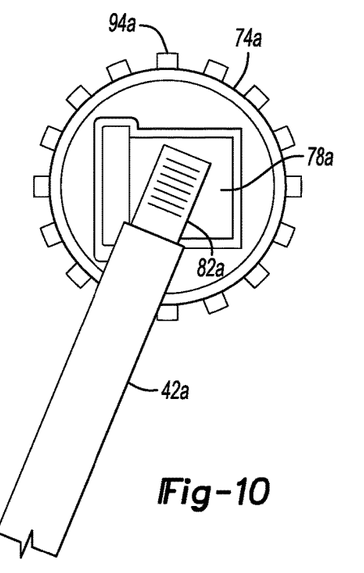
FIG. 10 shows a step in the assembly process subsequent to the step in FIG. 9.

After the wire 82*a* is secured to the tab 78*a*, the tab and terminal connector are placed within a first housing 74*a* as shown in FIG. 10. A second housing 86*a* is then clipped onto the first housing 74*a* with clips 90*a* that engage fingers 94*a*. The first housing 74*a* and second housing 86*a* then enclose the tab 78*a* and the wire 82*a*.

Figure 11:
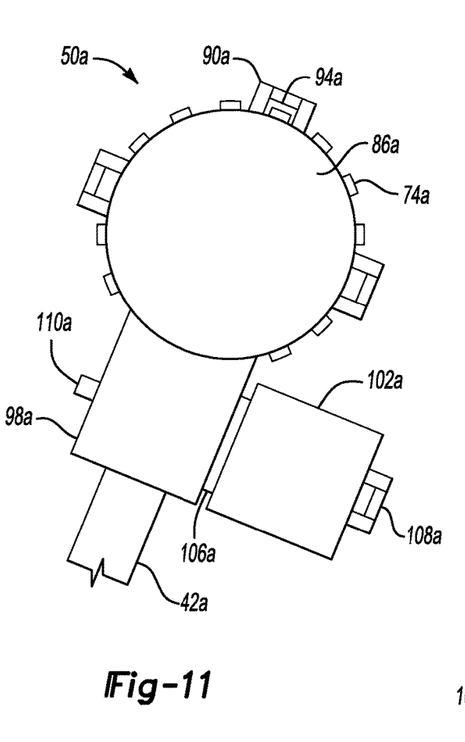
FIG. 11 shows another step in the assembly process subsequent to the step of FIG. 10.
Figure 12:
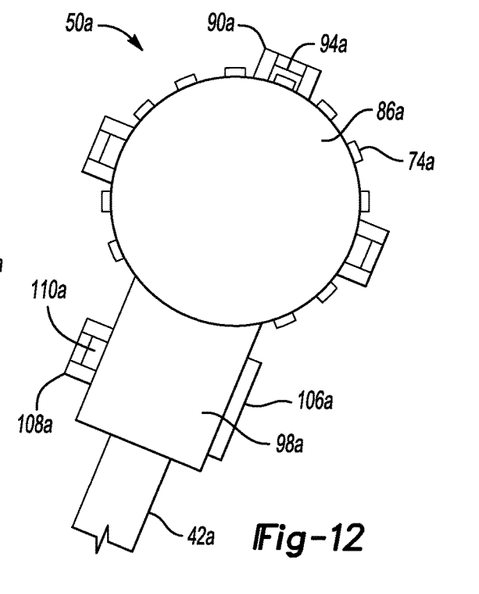
FIG. 12 shows another step in the assembly process subsequent to the step in FIG. 11.

A shield portion 98*a* of the first housing 74*a* is then aligned at the 7 o'clock position to accommodate the positioning of the lead 42*a* when the second housing 86*a* is clipped onto the first housing 74*a*.

A flange 102*a* is then rotated about a living hinge 106*a* so that a clip 108*a* can engage a finger 110*a*. The shield portion 98*a* then circumferentially surrounds the portions of the lead 42*a* adjacent the first housing 74*a*. The shield portion 98*a* is shown in a clipped position circumferentially surrounding the lead 42*a* in FIG. 12.

Figure 13:
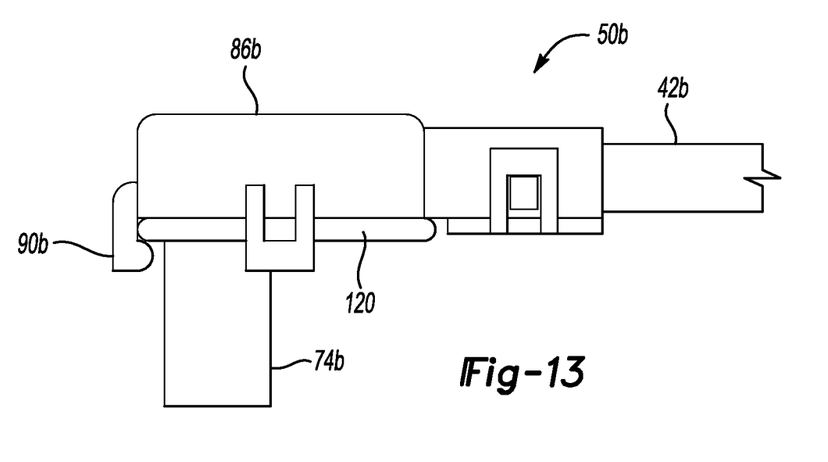
FIG. 13 shows another example connector suitable for use in the battery pack of FIG. 1.

Referring to FIG. 13, another example connector assembly 50*b* includes a ring portion 120 extending radially outward from a first housing 74*b*. Clips 90*b* extending from a second housing 86*b* can flex and fit over the ring portion 120 to engage together the first housing 74*b* and the second housing 86*b*.

Since the ring portion 120 is used (rather than the fingers 94 of the connector assembly 50 in FIG. 3), the connector assembly 50*b* can have an effectively infinite number of circumferential orientations for a take-out location of a lead 42*b*. Notably, the ring portion 120 would not resist forces associated with rotational movements of first housing 74*b* relative to the second housing 86*b* like would the fingers 94 of the connector 50 in FIG. 3. Thus, an attachment of the lead 42*b* to a terminal connect within the first housing 74*b* is, in some examples, robust enough to accommodate forces applied to connector assembly 50*b* that would otherwise rotate the first housing 74*b* relative to the second housing 86*b*.

Features of the disclosed examples include a connector that can be used to provide a variety of take-out locations. A different connector design is thus not required, which reduced part complexity.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:
1. A vehicle connector assembly, comprising:
a first housing;

a second housing configured to selectively engage the first housing in a first position to accommodate a first take-out location, and in a second position to accommodate a second take-out location different than the first take-out location, the first position circumferentially offset from the second position;

a lead attached to a tab held within the first housing, the first and second take-out locations where the lead extends from the tab, the lead circumferentially unconstrained by the first housing when the second housing is engaging the first housing in the first position or the second position; and a plurality of clips configured to engage to hold a circumferential position of the first housing relative to the second housing.

2. The assembly of claim 1, comprising a plurality of fingers, the plurality of clips configured to engage corresponding ones of the plurality of fingers to hold the circumferential position of the first housing relative to the second housing.

3. The assembly of claim 2, wherein the plurality of clips contact the corresponding ones of the plurality of fingers to limit circumferential movement of the first housing relative to the second housing.

4. The assembly of claim 1, comprising a radially extending ring, the plurality of clips configured to engage the radially extending ring to hold the first housing relative to the second housing.

5. The assembly of claim 1, wherein the lead is ultrasonically welded to the tab.

6. The assembly of claim 1, wherein the lead is a high-voltage lead and has a diameter that is five millimeters or more.

7. The assembly of claim 1, wherein the lead is circumferentially surrounded by a shield portion of the second housing.

8. The assembly of claim 1, wherein the lead extends from the tab in a first direction, and a terminal connector extends from the tab in a second direction transverse to the first direction.

9. The assembly of claim 8, wherein the first housing and the second housing comprise portions of a 90-degree connector.

10. The assembly of claim 1, comprising a lead and a traction battery of an electrified vehicle, the connector electrically coupling the lead to the traction battery.

11. The assembly of claim 1, comprising a lead and a high-voltage junction box of an electrified vehicle, the connector electrically coupling the lead to the high-voltage junction box.

12. An electrical connection method, comprising:

securing a first housing of a connector to a second housing in a first position to accommodate a first take-out location of a lead, wherein the first housing is securable to the second housing in a second position to accommodate a second take-out location instead of the first take-out location, the first position circumferentially offset from the second position, the lead is circumferentially unconstrained by the first housing; and securing the first housing to the second housing using a plurality of clips.

13. The method of claim 12, wherein the connector is a 90-degree connector.

14. The method of claim 12, comprising electrically coupling the lead to a traction battery of an electrified vehicle through the connector.

15. The method of claim 12, comprising electrically coupling the lead to a high-voltage junction box of an electrified vehicle through the connector.

16. The method of claim 12, comprising contacting the plurality of clips included in one of the first or second housing against a plurality of fingers in the other of the first or second housing to limit circumferential movement of the first housing relative to the second housing.

17. The method of claim 12, comprising engaging a radially extending ring of the first or second housing with the plurality of clips extending from the other of the first or second housing to secure the first housing relative to the second housing.

18. The method of claim 12, comprising surrounding the lead with a shield portion of the second housing.

19. A vehicle connector assembly, comprising:

a first housing;

a second housing;

a plurality of clips configured to selectively secure together the first and second housing in one of a plurality of different circumferential positions depending on an orientation of a lead secured to a tab held by the first housing, the lead circumferentially constrained from moving relative to the first and second housing by the first or the second housing, but not both.

20. The vehicle connector assembly of claim 19, wherein the second housing includes a shield portion having a flange that moveable to an engaged position, the shield portion annularly disposed about the lead when the flange is in the engaged position.

* * * * *